D. B. FARNSWORTH, Jr. & W. Z. ALLEN.
WELDED PIPE JOINT.
APPLICATION FILED JULY 22, 1916.
1,287,934.
Patented Dec. 17, 1918
2 SHEETS—SHEET 1.
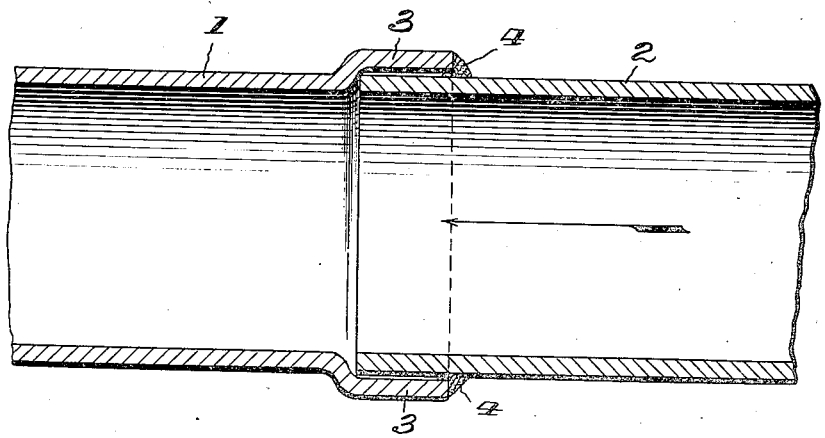
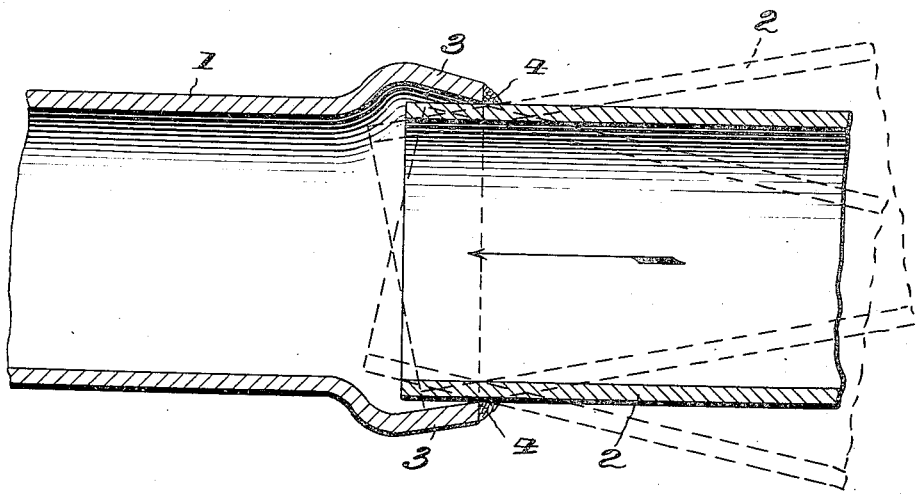
Inventors
Dexter B. Farnsworth Jr.
and Walter Z. Allen,
By Clark, Prentis & Clark
Attorneys

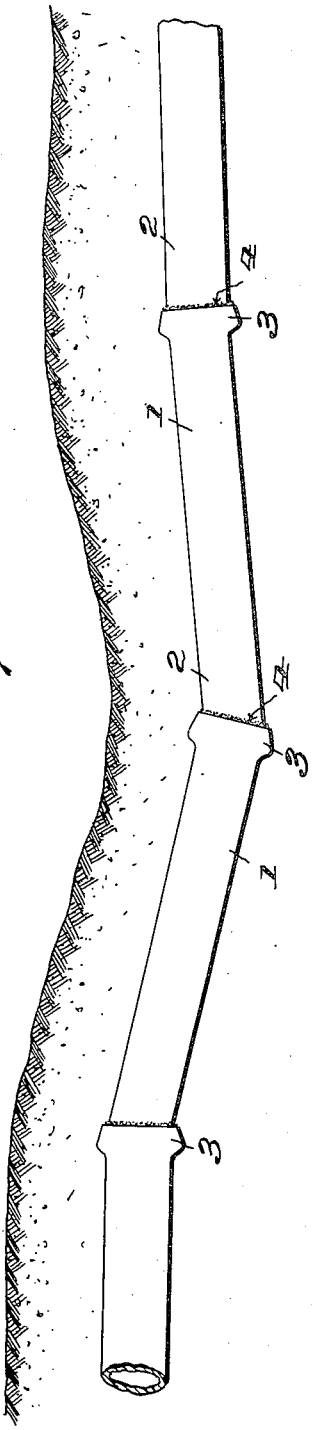
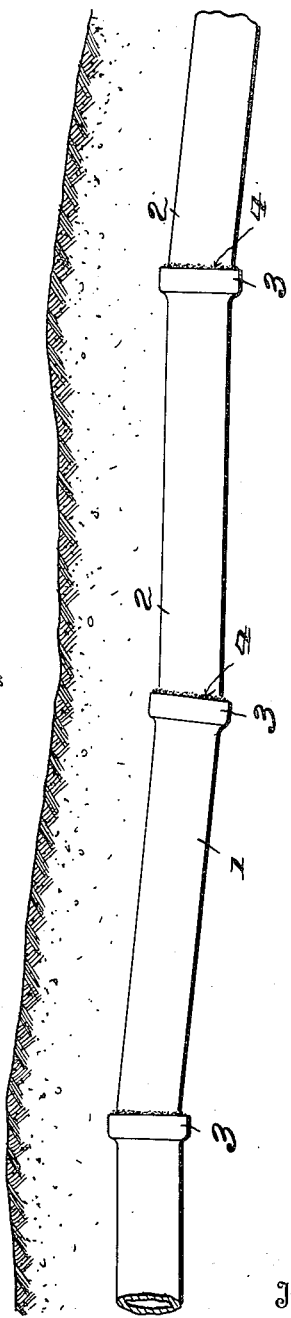

UNITED STATES PATENT OFFICE.

DEXTER B. FARNSWORTH, JR., OF TULSA, AND WALTER Z. ALLEN, OF SAPULPA, OKLAHOMA.

WELDED PIPE-JOINT.

1,287,934.  Specification of Letters Patent.  Patented Dec. 17, 1918.

Application filed July 22, 1916. Serial No. 110,677.

*To all whom it may concern:*

Be it known that we, DEXTER B. FARNSWORTH, Jr., and WALTER Z. ALLEN, are citizens of the United States, residing at Tulsa and Sapulpa, in the counties of Tulsa and Creek, respectively, and State of Oklahoma, have invented new and useful Improvements in Welded Pipe-Joints, of which the following is a specification.

This invention relates to welded pipe joints and pertains particularly to the welding of pipe joints for use in conveying oil or gas. The invention includes also the particular design of the pipe joint connections and also the manner of welding the joint by means of the oxy-acetylene flame or other application of heat to the point at which the welding action takes place.

One object of the invention is to provide a welded pipe joint for use in the conveying of oil or other fluid matter or gas which will be so designed as to hinder in no way the passage therethrough of a "go-devil" or other cleaning member.

Another object of the invention is to provide a welded pipe joint in which the end of one pipe is inserted into the enlarged end of a similar pipe and the end of the overlapping pipe is welded to the outer wall of the pipe which it encircles.

A further object of the invention provides for the ability to effect bends or breaks in pipe laying to conform to the irregularities in the surface of the country through which the pipe is laid without the necessity of bending the pipe by the application of heat. This is effected by the particular design of the pipe joint and the manner of welding.

A further object of the invention provides for a joint connection in which the end of the receiving member is flared inwardly from the receiving end so as to provide greater freedom in the laying of pipe and the determination of the angle at the pipe joint, the end of the overlapping pipe member being welded to the outer wall of the inserted member as hereinbefore mentioned.

A further object of the invention provides for the use of the oxy-acetylene flame in effecting the welding of the pipe joints mentioned.

Further features of the invention will be described in detail in the following specification and claims and illustrated in the accompanying drawings in which—

Figure 1 represents a vertical longitudinal section through one form of the welded pipe joint showing the enlarged end of the receiving pipe member encircling the inserted member and having the end of the overlapping member welded to the outer surface of the inserted member.

Fig. 2 represents a vertical longitudinal section through a welded pipe joint in which the receiving member has the enlarged receiving end with the bore of the pipe flared inwardly from the receiving end, the inserted member being welded to the end of the receiving member and the dotted lines illustrating the variations possible in the angle of the pipe joint.

Fig. 3 represents a section of pipe line in which the joint connections are similar to that illustrated in Fig. 2, this type of joint making possible the use at the joint of an angle sufficient to provide a deflection of five feet in a single length of pipe which is usually twenty feet long. It will be observed that this form of joint makes it possible to conform the pipe line to the irregularities of the ground surface.

Fig. 4 illustrates the use in a section of pipe line of the type of joint illustrated in Fig. 1, a small degree of deflection being possible by the freedom of play at the joint connection, a deflection of twenty inches being possible in a length of twenty feet.

Referring in detail to the drawings 1 represents the length of the pipe adapted to receive a second member 2 within the belled end 3. It will be noted that as shown in Fig. 1 the bore of the members 1 and 2 are substantially the same and that the wall of the belled portion 3 encircles the end of the member 2 inserted therein. The material is preferably of steel or some form of iron other than cast material inasmuch as cast iron may not be easily welded and is not suitable for working. Heretofore where belled ends have been used for an overlapping connection sufficient room has been provided between the inserted end and the inner wall of the belled end to provide space for a packing of jute and lead or other soft material. The present invention provides for a close-fitting connection and the use of the oxy-acetylene flame for welding the end of the belled portion 3 to the wall of the inserted pipe 2. To facilitate the welding process a filler wire 4 is used in welding the part 3 to the part 2, this wire combining with the material of either section of pipe under the action of the oxy-acetylene flame. As used in the piping of oil it is necessary often, to use a "go-devil" or some other cleaning means and to force the same through the pipe. If a butt-end weld is effected, the welded joint is subject to the fault called penetration due to the flowing of the metal inwardly and closing to some degree the bore of the pipe, at least to the extent of checking the progress therethrough of a "go-devil". The present invention by welding the end of the overlapping pipe prevents this inflow of metal into the bore of the pipe.

Another result which is advantageous and effected by the particular construction of the joint is the ease with which the pipe sections are lined up for welding. As was formerly the case before our invention, difficulty was experienced in welding pipe joints because of the fact that the pipe sections had to be lined up so that the ends thereof abutted and were brought close together so that the application of heat would effect a welded joint. Delay was experienced due to the trouble in alining the pipe sections and even when welded the penetration of the weld into the interior of the pipe destroyed the use of the same for the passage of oil inasmuch as this use necessitates the frequent cleaning of the pipe. It will be obvious from the drawings and description that our invention makes it possible to effect the weld regardless of the alinement of the pipe, the only necessary feature being that the pipe shall overlap and that the end of the overlapping section closely embrace the inserted member so that the welding may be effected.

Heretofore it has been necessary to bend sections of pipe in order to conform to the irregularities of the country through which the pipe is laid. It has been necessary to have the curves in the pipe or bends formed at the factory or to use the tedious method of bending, by use of fire, the pipe near the place where it is laid. This cause of delay and expense is obviated by the present construction which permits a slight bend at the joint in the type illustrated in Figs. 1 and 4 and a greater degree of bend in the type illustrated in Figs. 2 and 3.

In the type illustrated in Figs. 1 and 4 the clearance between the outer wall of the inserted pipe 2 and the inner wall of the receiving pipe 1 should be at least one-sixteenth of an inch to provide for a deflection of twenty inches in twenty feet of pipe. In the type illustrated in Figs. 2 and 3 the construction provides for a deflection of as much as five feet in the same length of pipe.

Referring to the form illustrated in Figs. 2 and 3 it will be observed that the enlarged receiving end 3 is flared inwardly from the end rim of the pipe to provide for a greater angular movement of the inserted member as illustrated in dotted lines. This type of enlarged receiving end may be made by expanding tools applied to the form illustrated in Fig. 1. It is necessary in this form also that the extreme end of the receiving pipe closely embrace the outer wall of the inserted member so that the welding may be effected. The use of a hard metal filler wire greatly facilitates the welding of the parts.

From the foregoing description it will be obvious that the present invention provides for the inexpensive welding of pipe joints and that this welding may be effected after the pipe has been laid. In actual operation sections of pipe may be laid by one set of workmen and the next set engaged in the welding process may follow later. This is to be contrasted to the former processes of welding in which it is necessary for a group of men to aline the two sections of pipe and keep the sections in alinement and end to end while a third man is necessary to perform the welding of the joint. The oxy-acetylene apparatus may be conveyed to any part of the pipe line. No special apparatus is necessary for alining and none of the welding need be done at the factory as is the case where special machinery is necessary for hammering the parts or where electrical apparatus must be used near the source of the electric current.

Changes in the relative length of the pipe and the relative length of the overlapping portions may be made without departing from the scope of the invention.

What we claim is:—

1. An oxy-acetylene welded pipe joint comprising a first pipe member having an enlarged receiving opening at one end thereof and a second pipe member extending into said receiving opening and providing an annular space between said first and second members extending the length of said second member within said opening, the end rim of said receiving opening being welded to the outer surface of said second pipe member which it encircles, said annular space being maintained in an open condition so that the joint may be angular.

2. An oxy-acetylene welded pipe joint comprising a first pipe member having an enlarged receiving opening, a second pipe member extending into said receiving opening and providing an annular space between said first and second members extending the length of said second member within said opening, and a welded filler wire encircling said second member and joining the annular end of said receiving member and the outer wall of said second member to which it is welded, said annular space being maintained in an open condition so that the joint may be angular.

3. A welded pipe joint comprising a first tubular member having a central bore and an enlarged bore adjacent one end constituting a receiving opening, and a second tubular member extending into the bore of said receiving opening and providing an annular space between said first and second members extending the length of said second member within said opening, the outer wall of said second member and the inner wall of said receiving opening being parallel and the end rim of said receiving opening being welded to the body of the second member which it encircles, said annular space being maintained in an open condition so that the joint may be angular.

In testimony whereof we affix our signatures.

DEXTER B. FARNSWORTH, Jr.
WALTER Z. ALLEN.